United States Patent
Nagai

[11] Patent Number: 5,825,745
[45] Date of Patent: Oct. 20, 1998

[54] DATA STORAGE-PLAYBACK APPARATUS AND OPTICAL DISK APPARATUS

[75] Inventor: Koichi Nagai, Kanagawa-ken, Japan

[73] Assignee: Kabushiki Kaisha Toshiba, Kawasaki, Japan

[21] Appl. No.: 553,053

[22] Filed: Nov. 3, 1995

[30] Foreign Application Priority Data

Nov. 10, 1994 [JP] Japan ................................. 6-276262

[51] Int. Cl.⁶ ........................... G11B 21/02; G11B 17/30
[52] U.S. Cl. ........................................... 369/219; 369/249
[58] Field of Search ................................. 369/215, 219, 369/249, 258, 220, 244, 44.14, 44.15, 44.16, 44.21, 44.22; 359/814, 823, 824; 310/12, 13

[56] References Cited

U.S. PATENT DOCUMENTS

| | | | |
|---|---|---|---|
| 4,698,798 | 10/1987 | Faber et al. | 369/219 |
| 4,908,816 | 3/1990 | Champagne et al. | 369/219 |
| 5,138,605 | 8/1992 | Shtipelman et al. | 369/215 |
| 5,245,232 | 9/1993 | Nihei et al. | 310/12 |
| 5,278,820 | 1/1994 | Shtipelman | 369/219 |
| 5,361,243 | 11/1994 | Kasahara | 369/44.15 |
| 5,511,062 | 4/1996 | Schoneveld et al. | 369/219 |

FOREIGN PATENT DOCUMENTS

| | | | |
|---|---|---|---|
| 1223674 | 9/1989 | Japan | 369/215 |
| 4-125864 | 4/1992 | Japan | 369/215 |

*Primary Examiner*—Stuart L. Levy
*Assistant Examiner*—David L. Ometz
*Attorney, Agent, or Firm*—Finnegan, Henderson, Farabow, Garrett & Dunner, L.L.P.

[57] ABSTRACT

A data storage-playback apparatus includes a head for storing and playing data which is movable on the data storage media. A guide rail guides the head along a predetermined direction of the data storage media. The guide rail is composed of a ferromagnetic substance and passes through a coil. The coil is fixed to the head. A yoke is magnetically connected with the guide rail. A permanent magnet is fixed to the yoke and oriented with a magnetic direction aligned toward a curved surface of the coil. A length of the permanent magnet along the magnetic direction is larger than a height of the permanent magnet along a direction perpendicular to both the magnetic direction and a length direction of the guide rail.

16 Claims, 6 Drawing Sheets

DATA STORAGE-PLAYBACK APPARATUS AND OPTICAL DISK APPARATUS

BACKGROUND OF THE INVENTION

1. Field of the Invention

The present invention relates to a data storage-playback apparatus and an optical disk apparatus, each having a head movable over the data storage media quickly and stably.

2. Description of the Related Art

In a data storage-playback apparatus for storing and playing data of a data storage media, such as an optical disk, magnetic disk or optical card, head-moving apparatus is used because a head (optical head or magnetic head) for storage and playback of data is moved to a desired position on a surface of the data storage media.

Figure 1:
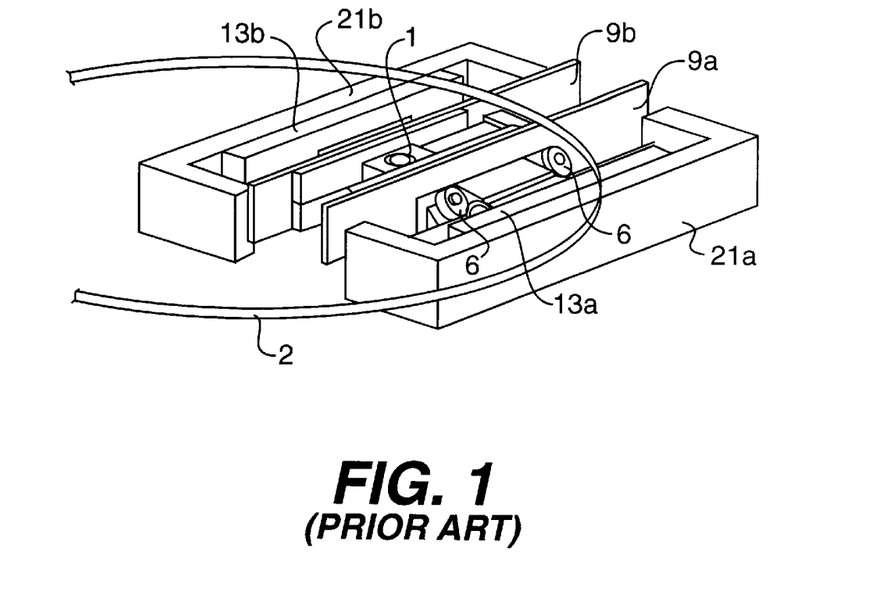
FIG. 1 is a schematic diagram of structure of an internal portion of optical disk apparatus according to the prior art.
Figure 2:
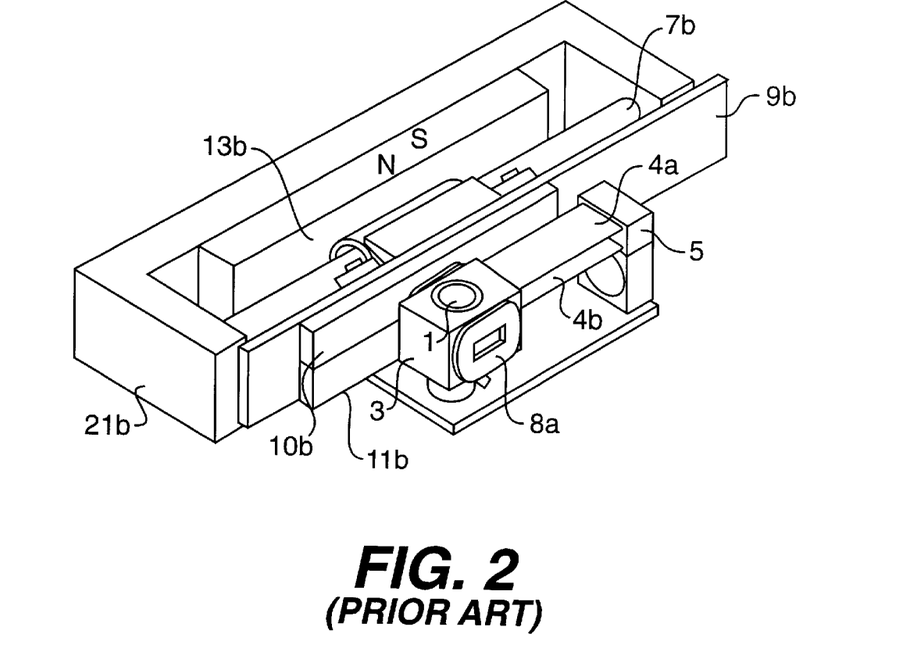
FIG. 2 is a schematic diagram of a part of head-moving apparatus included in the optical disk apparatus shown in FIG. 1.
Figure 3:
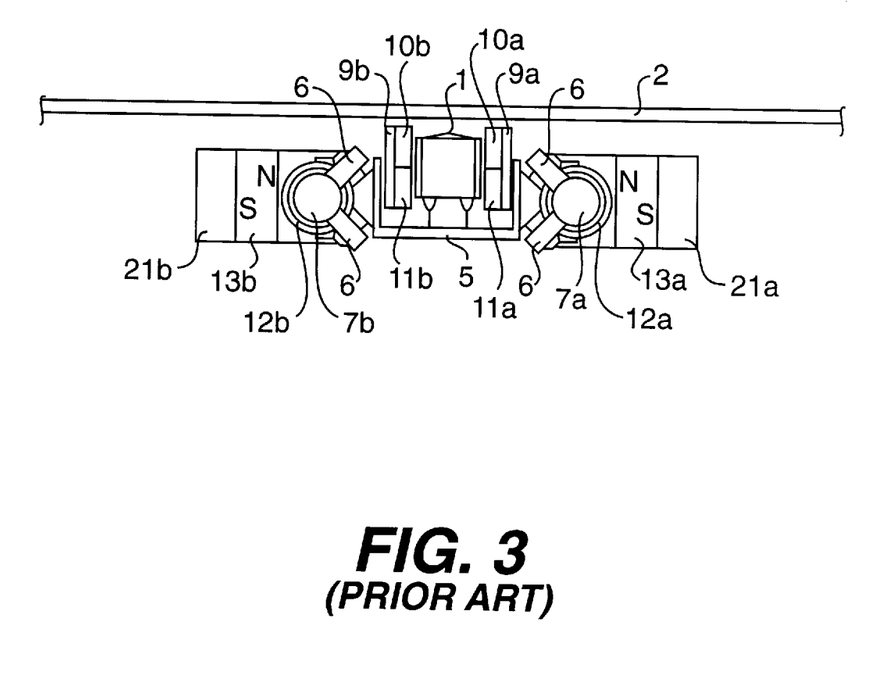
FIG. 3 is a sectional view of the optical disk apparatus shown in FIG. 1.

The processing of the head-moving apparatus used for the optical disk apparatus will be explained. FIG. 1 is a schematic diagram of structure of an internal portion of optical disk apparatus of the prior art. FIG. 2 is a schematic diagram of a part of the head-moving apparatus shown in FIG. 1. FIG. 3 is a sectional view of FIG. 1. A laser beam from a laser lightsource (not shown) is guided to an objective lens 1 through optical elements, i.e., collimation lens, beam splitter or mirror. Then, the laser beam is focused on the recording layer of an optical disk 2. Light of the laser beam reflected from the optical disk 2 passes through the objective lens 1 and reaches a photo detector (not shown) through optical elements, such as a mirror or beam splitter. The objective lens 1 is fixed in an objective lens-holder 3 that is connected to a carriage 5 through two parallel leaf springs 4a, 4b. The objective lens 1 is elastically held to move in a direction perpendicular to the optical disk 2. Two focus coils 8a, 8b, each of which is generally circularly wound, are attached on both sides of the objective lens holder 3. A first focus magnet 10a and a second focus magnet 11a are attached to a focus yoke 9a, each of which confronts the focus coil 8a. Another first focus magnet 10b and another second focus magnet 11b are attached to a focus yoke 9b, each of which confronts the focus coil 8b. A magnetic direction of the focus magnets 10a, 10b is parallel to a tangential direction of the optical disk 2. The magnetic direction of the focus magnets 10a, 10b is opposite to the magnetic direction of the focus magnets 11a, 11b. When an electric current is sent through the focus coils 8a, 8b, a Lorentz force is generated on the focus coils 8a, 8b, having a direction perpendicular to the surface of the optical disk 2. Therefore, the objective lens is moved in the direction (focus direction) perpendicular to the surface of the optical disk 2. Normally, the objective lens 1 is moved so that a focus of the laser beam is convergent on the recording layer of the optical disk 2 by using control apparatus (not shown).

On both sides of the carriage 5, bearings 6, each of which is a wheel composed of ferromagnetic substance, are attached so that the bearings 6 contact with guide rails 7a, 7b to rotate. In short, the carriage 5 is moved along the radius direction of the optical disk 2 on the bearing 6. Radial coils 12a, 12b are attached to both side of the carriage 5. The radial coils 12a, 12b are cylindrical coils. In an open middle section of the radial coils, the guide rails 7a, 7b, each of which is composed of a ferromagnetic substance and fixed at their ends (not shown) pass through and out of contact with the radial coils 12a, 12b, respectively.

Radial yokes 21a, 21b are located to magnetically connect between both ends of the guide rails 7a, 7b, respectively. Radial magnets 13a, 13b are attached to an inside surface of the radial yokes 21a, 21b, respectively. When an electric current passes through the radial coils 12a, 12b, the Lorentz force is generated. Therefore, the carriage 5 is moved in the radius direction of the optical disk 2. Then, a focus of the laser beam is moved to a desired position on the optical disk 2. In such an optical disk apparatus for which the above described head-moving apparatus is employed, if the linearity of a contact position of the bearings 6 with the guide rails 7a, 7b is poor, the head-moving apparatus inclines relative to a desired position along the radius direction. As a result, the laser beam is inclined relative to the optical disk apparatus and proper data storage and playback is prevented.

Accordingly, high linearity is required for the guide rails 7a, 7b. As for mass production of the guide-rail, a columnar one which is sanded by a centerless grinder is selected.

In general, in order to reduce access-time for the data storage-playback apparatus, it is required that the head section is quickly moved to a desired position on the data storage medium. Accordingly, it is necessary to use a strong radial magnetic circuit. In order to increase a driving force of the radial magnetic circuit, the magnitude of electric current conducted through the radial coil is increased, a number of windings of the radial coil is increased, or a quantity of magnetic flux to intersect the radial coil is increased. However, it is desired that a method to increase the quantity of the magnetic flux is used in order to save energy and suppress heating. In this case, a magnet including a strong magnetic force is used. In order to increase the magnetic force, a large magnet can be used. Then, in order to reduce the capacity of the magnet and increase the use-efficiency of the magnet, the configuration of the magnet or magnetic circuit is determined so that an operating point of the magnet approaches a maximum point of the energy product. In the case of a design on this basis, as for the head-moving apparatus used for an optical disk whose diameter is 3.5inch~5inch, a length of the magnetic direction of the magnet is shorter than a length in the direction perpendicular to a surface of the data storage medium.

However, if the magnetic force of the magnet is increased by using the above-described design method, a leakage magnetic field is increased, the bearings composed of ferromagnetic substance are magnetized and acceleration of the carriage is decreased by an increased moving resistance of the carriage. Therefore, in accordance with the design method of the prior art, it is necessary to reduce the leakage magnetic field by using a small driving force. As a result, it is only possible to improve the efficiency of the magnet under such conditions.

SUMMARY OF THE INVENTION

It is an object of the present invention to provide a data storage-playback apparatus and an optical disk apparatus for moving the head section to a desired position on the data storage media quickly and stably.

According to the present invention, there is provided a data storage-playback apparatus, comprising: head means for at least one of storing and playing data of data storage media; guide rail means for guiding said head means in a predetermined direction of the data storage media, said guide rail means being composed of a ferromagnetic substance; coil means through which said guide rail means passes, wherein said coil means is fixed to said head means; a yoke having a length portion and leg portions extending from the length portion to magnetically couple with said guide rail means; and permanent magnet means fixed to said yoke and located with a magnetic direction thereof aligned toward a curved surface of said coil means, wherein a length of said permanent magnet means along the magnetic direction is larger than a height of said permanent magnet means along a direction perpendicular to both the magnetic direction and a length direction of said guide rail means.

Further in accordance with the present invention, there is provided a data storage-playback apparatus, comprising: head means for at least one of storing and playing data of data storage media; guide rail means for guiding said head means in a predetermined direction of the data storage media, said guide rail means being composed of a ferromagnetic substance; support means for supporting said head means to move along said guide rail means, said support means being composed of a ferromagnetic substance and mounted to said head means; coil means through which said guide rail means passes, wherein said coil means is fixed to said head means; a yoke having a length portion and leg portions extending from the length portion to magnetically couple with said guide rail means; and permanent magnet means fixed to said yoke and located with a magnetic direction thereof aligned toward a curved surface of said coil means, wherein a length of said permanent magnet means along the magnetic direction is larger than a height of said permanent magnet means along a direction perpendicular to both the magnetic direction and a length direction of said guide rail means.

DETAILED DESCRIPTION OF THE PREFERRED EMBODIMENTS

Figure 4:
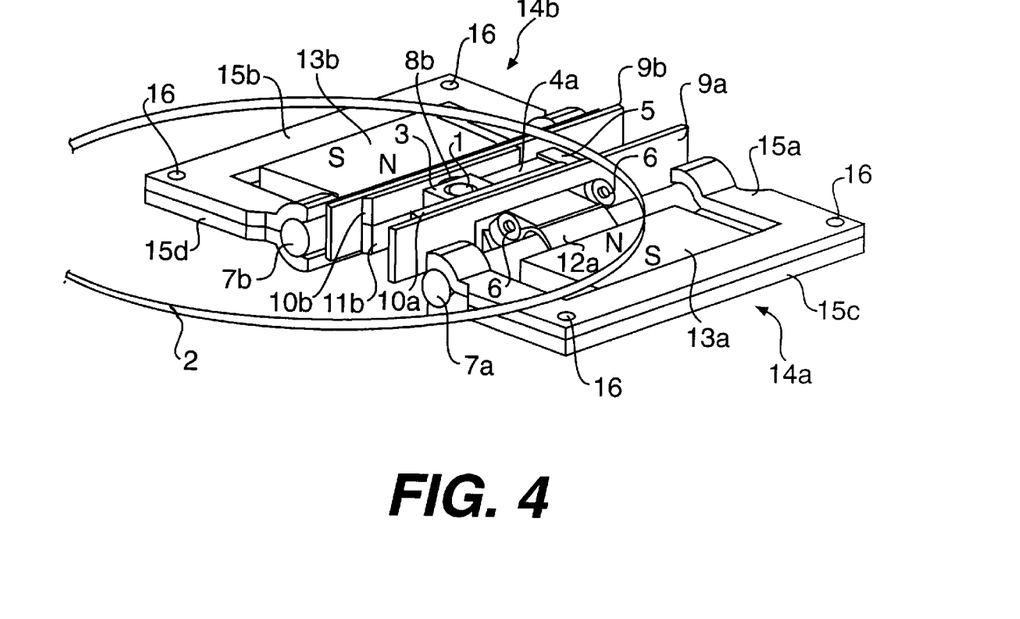
FIG. 4 is a schematic diagram of structure of an internal portion of optical disk apparatus according to a first embodiment of the present invention.
Figure 5:
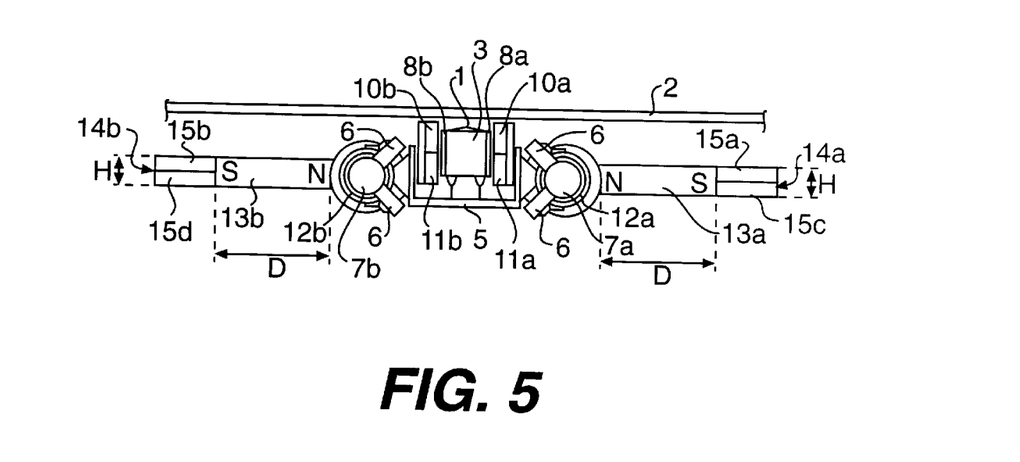
FIG. 5 is a sectional view of the optical disk apparatus shown in FIG. 4.

Embodiments of the present invention will be explained in detail. FIG. 4 is a schematic diagram of structure of an internal portion of optical disk apparatus according to a first embodiment of the present invention. FIG. 5 is a sectional view of the optical disk apparatus shown in FIG. 4. In the first embodiment, the optical disk apparatus will be explained as an example of data storage-playback apparatus.

A laser beam from a laser lightsource (not shown) is guided to the objective lens 1 through optical elements such as a collimation lens, beam splitter and mirror. As a result, the laser beam is focused on the optical disk 2 (data storage media). Then, the laser beam is reflected on the optical disk 2, passes through the objective lens 1 and reaches a photo detector (not shown) through the optical elements.

The objective lens 1 is fixed in the objective lens-holder 3 connected to the carriage 5 by the two parallel leaf springs 4a, 4b. The objective lens 1 is elastically held to move in a direction perpendicular to the surface of the optical disk 2.

Two focus coils 8a, 8b wound circularly are attached to the objective lens holder 3. The focus coil 8a confronts focus magnets 10a, 11a attached to focus yoke 9a and the focus coil 8b confronts focus magnet 10b, 11b attached to focus yoke 9b. The two focus magnets 10a, 10b are first focus magnets and the two focus magnets 11a, 11b are second focus magnets. The magnetized direction of the focus magnets 10a, 10b is parallel to a tangential direction of the optical disk 2. The magnetic direction of the focus magnets 10a, 10b and the magnetic direction of the focus magnets 11a, 11b are opposite each other. If an electric current is passed through the focus coils 8a, 8b, a Lorentz force is generated in the focus coils 8a, 8b direction perpendicular to the optical disk 2. Therefore, the objective lens 1 is moved along the direction (focus direction) perpendicular to the optical disk 2. Normally, the objective lens 1 is moved so that a focus of the laser beam converges on the optical disk 2.

Four pairs (a total of eight) of bearings 6 are rotatably attached to the carriage 5 so that the bearings rotate by contacting guide rails 7a, 7b. The carriage 5 is moved along the radius direction of the optical disk 2. Radial coils 12a, 12b are attached to the carriage 5. The radial coils 12a, 12b are cylindrical coils. The guide rails 7a, 7b whose composition includes a ferromagnetic substance, pass through and out of contact with the radial coils 12a, 12b, respectively.

A first radial yoke 14a is comprised of two yokes 15a, 15c which are stacked. A second radial yoke 14b is comprised of two yokes 15b, 15d which are stacked. The two yokes forming each of yokes 14a and 14b are aligned by screw holes 16. The yokes 15a, 15b, 15c, 15d are punching boards which are formed by press working of sheet metal. Distal ends of leg portions of the radial yokes 14a, 14b are formed into receiving portions with curved surfaces to receive end portions of the guide rails 7a, 7b, by means of forming the yokes 15a, 15b, 15c, 15d with suitably shaped curved surface. The distal ends of the leg portions of the radial yokes 14a, 14b is positioned to receive in the receiving portions the end portions of the guide rails 7a, 7b. The yokes 15a, 15b, 15c, 15d are positioned by the screw holes 16 so that the guide rails 7a, 7b are received in the receiving portions. In this way, the radial yokes 14a, 14b are magnetically connected to the guide rails 7a, 7b.

Radial magnets 13a, 13b are attached to the radial yokes 14a, 14b. The magnetized direction of the radial magnets 13a, 13b is the same as the tangential direction of the optical disk 2. If an electric current is passed through the radial coils 12a, 12b, a Lorentz force is generated in a part of the radial coils 12a, 12b (a portion held between the radial magnets 13a, 13b and the guide rails 7a, 7b). Therefore, the carriage 5 is moved along the radius direction of the optical disk 2.

As a result, a focus of the laser beam is moved to a desired position on the optical disk 2.

In the case that the guide rails 7a, 7b, the radial yokes 14a, 14b and the radial magnets 13a, 13b are formed from an oxidizable material such as steel, it is desirable that an antioxidant coating be formed on the steel such as by plating. Ordinarily, the antioxidant coating is very thin and its effect on magnetic resistance can be ignored even if it is a non-magnetic substance.

As shown in FIG. 5, in the head moving apparatus of the first embodiment, a length D of the radial magnets 13a,13b along the magnetized direction is longer than a dimension H of the height direction of the magnetic circuit (a direction perpendicular to both the magnetized direction and-length direction of the guide rail 7a, 7b). An aspect ratio (H/D) of the radial magnet is smaller than 1. As a result, a shape of the radial magnet is different from that of the prior art, wherein the radial magnet has an aspect ratio larger than 1.

Therefore, in the prior art, magnetic flux is often generated, which passes from a magnetic pole N to the guide rails 7a, 7b and returns to a magnetic pole S through air above and below the magnetic circuit. This magnetic flux is a leakage magnetic field which does not pass through the radial yoke 14a, 14b. However, in accordance with the first embodiment of the present invention, the leakage magnetic field is reduced because the thickness of the radial magnets 13a, 13b in the vertical direction is small. A lot of magnetic flux is generated, which passes from the magnetic pole N to the guide rails 7a, 7b and returns from edge portion of the guide rails 7a, 7b to the magnetic pole S through the radial yokes 14a, 14b. As a result, the leakage magnetic field which causes the running resistance to increase is reduced, and a drive force of the magnetic circuit is effectively generated.

If the radial magnets 13a, 13b are only formed long along the magnetized direction, the leakage magnetic field is increased because magnetic power is increased. In order to suppress the leakage magnetic field, it is desired that the dimension in the direction perpendicular to both the magnetized direction of the radial magnets 13a, 13b and the length direction of the guide rails 7a, 7b is shortened in correspondence with the formed length of the radial magnets 13a, 13b along the magnetized direction. In this case, the leakage magnetic field is effectively reduced while the magnetic flux density remains at a predetermined level. Therefore, an increase of the running resistance which is caused by magnetization of the bearings 6 is suppressed. At the same time, the leakage magnetic field surrounding the bearings 6 is reduced because a distance between the bearings 6 and the magnetic poles is increased.

Figure 6:
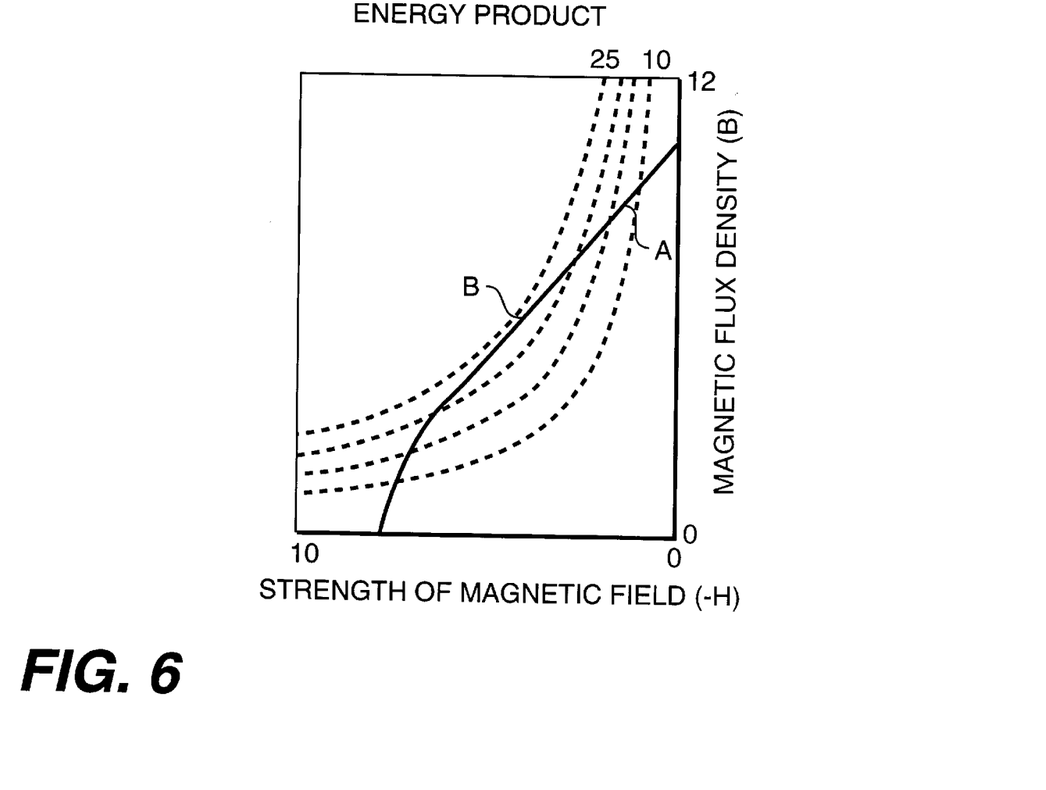
FIG. 6 is a graphical representation showing an operating point of a radial drive magnet of the head-moving apparatus according to the present invention.

FIG. 6 is a graphical representation of an operating point of the radial magnets 13a, 13b of the head-moving apparatus used for the optical disk apparatus. In FIG. 6, a vertical axis represents magnetic flux density, a horizontal axis represents strength of magnetic field and dotted lines represent contour lines of energy product. In the design method of the magnetic circuit of the prior art, the radial magnet is used in area B to provide an operating point whose energy product is maximum. In the head-moving apparatus of the first embodiment of the present invention, the radial magnet is used in area A whose energy product is smaller than that of area B but whose magnetic flux density is high. In this case, a use-efficiency of the radial magnet is reduced but the magnetic flux density is higher. Accordingly, the magnetic flux is concentrated because an area of the radial magnet facing to magnetic gap is small. Then, magnetization of the bearings is suppressed and the running resistance of the carriage is reduced because the leakage magnetic field around the bearings' positions is reduced.

In FIG. 6, the energy product of the area A is approximately one half of the energy product of the area B. However, another area whose energy product is smaller than that of the area A may be selected. Because another area whose energy product is smaller is selected, the ratio of increasing the magnetic flux density is reduced but the running resistance of the carriage is greatly reduced.

Figure 7:
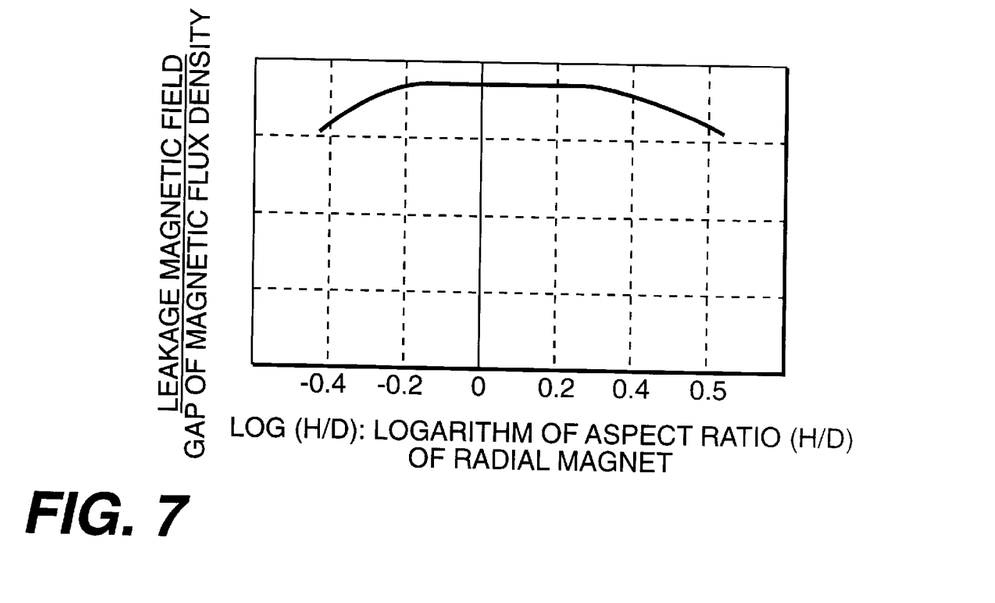
FIG. 7 is a graphical representation showing a relation between an aspect ratio of the radial drive magnet and a leakage magnetic field.

FIG. 7 is a graphical representation of the relation between the aspect ratio (H/D) of the radial magnets and the leakage magnetic field. In this case, FIG. 7 represents a relation between the logarithm of the aspect ratio of the radial magnets 13a, 13b and the value of the leakage magnetic field at a point of contact of the bearings 6 for the guide rails 7a, 7b divided by drive sensitivity. As shown in FIG. 7, drive sensitivity is represented by the magnetic flux density at airgap between the radial magnet and guide rail. In FIG. 7, the diameter of the guide rail is "5 mm". As shown in FIG. 7, the leakage magnet field is large within a limit (−0.2<LOG(H/D)<0.3), and the leakage magnet field is small beyond the limit. Conversely, if the logarithm of the aspect ratio is above −0.5(H/D=3.2) or below −0.3(H/D= 0.5), the leakage magnetic field is greatly reduced.

In the case that the logarithm of the aspect ratio is large, the operating point moves toward the left-lower direction of the magnetic characteristics in FIG. 6. Most magnets include a characteristic by which the magnetic flux density decreases if the operating point moves toward the left-lower direction. After the magnet is magnetized, the magnet is demagnetized if the operating point is not positioned in the straight line area of the magnetic characteristics in FIG. 7. If the aspect ratio is increased, it often happens the operating point goes in curved line area in FIG. 7 and the magnet is demagnetized. However, in the case that a rare earth magnet or ferrite magnet is used, it often happens that the magnet is not demagnetized even if the aspect ratio is increased.

Figure 8:
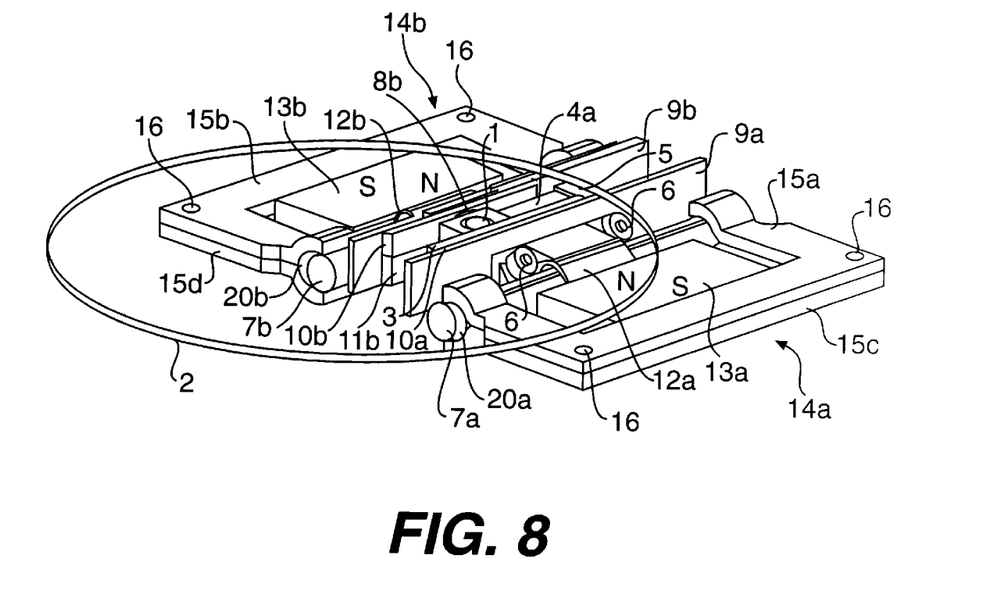
FIG. 8 is a schematic diagram of structure of an internal portion of optical disk apparatus according to a second embodiment of the present invention.

Next, a second embodiment of the present invention will be explained. FIG. 8 is a schematic diagram of structure of an internal portion of the optical disk apparatus according to the second embodiment of the present invention. As shown in FIG. 8, sub-yokes 20a, 20b which are formed of a ferromagnetic substance are positioned along the guide rails 7a, 7b to be between the guide rails and the radial magnets 13a, 13b respectively. The sub-yokes 20a, 20b are thus positioned in an air gap between the guide rails 7a, 7b and the radial coils 12a, 12b, respectively. To fit within the air gap, each of the sub-yokes preferably has a crescent shaped cross section. In the second embodiment, the radial magnets 13a, 13b are further displaced from the bearings 6. Therefore, the leakage magnetic field in the region of the bearings 6 is reduced and the running resistance of the carriage 5 is further reduced in comparison with the first embodiment.

Alternatively, in the case that the guide rails 7a, 7b are each provided with an elliptical cross section, for which a long diameter of the ellipse of the guide rail cross section coincides with the magnetized direction of the radial magnets 13a, 13b, an effect similar to the second embodiment is gained.

Figure 9:
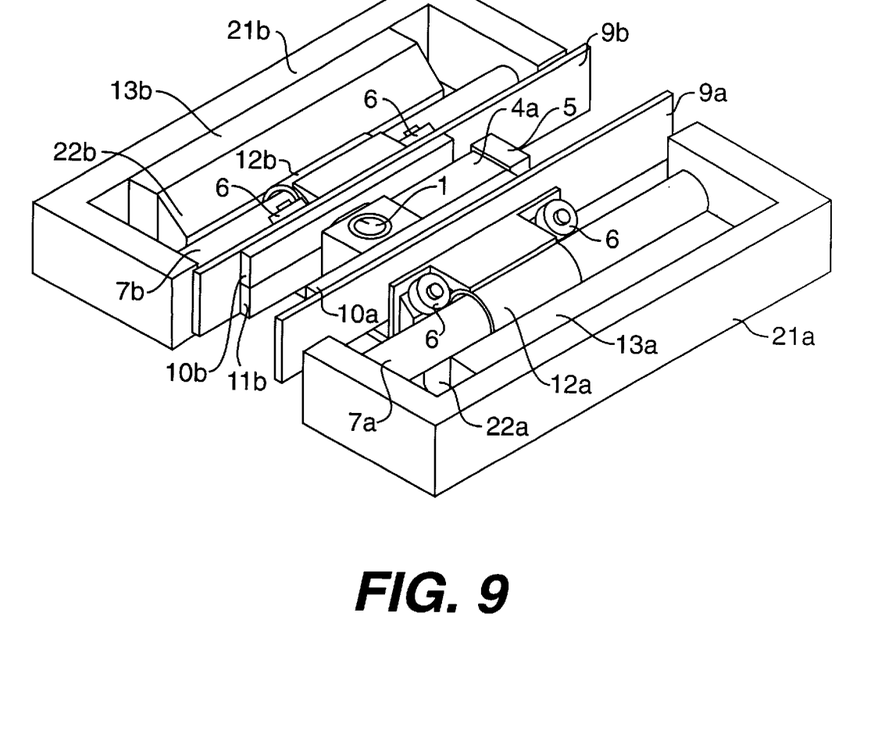
FIG. 9 is a schematic diagram of structure of an internal portion of optical disk apparatus according to a third embodiment of the present invention.
Figure 10:
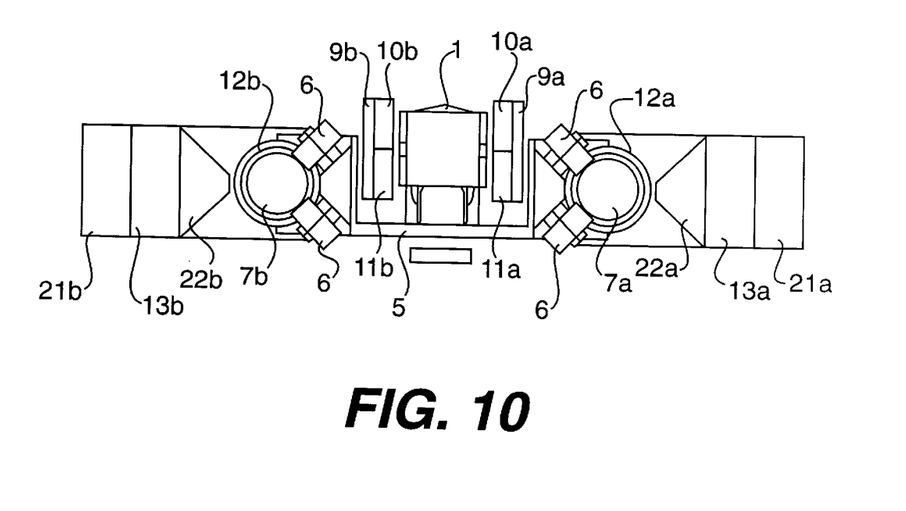
FIG. 10 is a sectional view of the optical disk apparatus shown in FIG. 9.

Next, a third embodiment of the present invention will be explained. FIG. 9 is a schematic diagram of structure of an internal portion of optical disk apparatus according to the third embodiment of the present invention. FIG. 10 is a sectional view of the optical disk apparatus shown in FIG. 9. A specific feature of the third embodiment is provision of sub-yokes 22a, 22b. Other portions of the structure are same as those of the optical disk apparatus shown in FIG. 1–3. In the third embodiment, the sub-yokes 22a, 22b are attached to the guide rail side of the radial magnets 13a, 13b. As for a height of the sub-yokes 22a, 22b whose direction is perpendicular to both the length direction of the guide rail 7a, 7b and the magnetized direction of the radial magnets 13a, 13b, the height of the guide rail side is smaller than the height of the radial magnet-side. If a electric current is passed through the radial coils 12a, 12b, a Lorentz force is generated so that the carriage 5 is moved along the radius direction of the optical disk 2. Then, a focus of the laser beam is moved to a desired position on the optical disk 2.

In the third embodiment, if the magnetic flux is generated from the guide rail side of the radial magnets 13a, 13b, the magnetic flux is converged by the sub-yokes 22a, 22b and concentrated on a part of the sub-yoke side of the radial coils 12a, 12b. Then, the magnetic flux passes through the cross section of the guide rails 7a, 7b. Therefore, the leakage magnetic field at the position of the bearing 6 is small, magnetization of the bearings 6 is suppressed and the running resistance of the carriage 5 is reduced.

In the above embodiments, bearings which rotate on the side face of the guide rail are used as support means. However, a bushing which slides along the guide rail may be used as the support means.

In the above embodiments, the optical disk apparatus as the data storage-playback apparatus was described in detail. However, magnetic disk apparatus (e.g., 5inch, 3.5inch, 2.5inch, 1.8inch) may be used as the data storage-playback apparatus. In the magnetic disk apparatus, an effect similar to the optical disk apparatus is gained according to the present invention.

Additional advantages and modifications will readily occure to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. A data storage-playback apparatus comprising:
    head means for at least one of storing data on a data storage medium and reading data from the data storage medium;
    guide rail means for guiding said head means in a predetermined direction along the data storage medium, said guide rail means being composed of magnetic substance;
    a coil receiving said guide rail means therethrough, said coil being fixed to said head means;
    yoke means for providing a magnetic path extending along said guide rail means; and
    permanent magnet means for providing a magnetic field passing through said magnetic path provided by said yoke means, said permanent magnet means having
        a magnetic direction aligned toward a surface of said coil,
        a length in the magnetic direction, and
        a height in a direction perpendicular to both the magnetic direction and a length direction of said guide rail means, the height of said permanent magnet means being less than the length of said permanent magnet means in the length direction of said guide rail means.

2. The data storage-playback apparatus according to claim 1, wherein the height of said permanent magnet means is uniform in the length direction of said guide rail means.

3. A data storage-playback apparatus comprising:
    head means for at least one of storing data on a data storage medium and reading data from the data storage medium;
    guide rail means for guiding said head means in a predetermined direction along the data storage medium, said guide rail means being composed of a magnetic substance;
    support means for supporting said head means for movement along said guide rail means, said support means being composed of a magnetic substance and being mounted to said head means;
    a coil for receiving said guide rail means therethrough, said coil being fixed to said head means;
    yoke means for providing a magnetic path extending along said guide rail means; and
    permanent magnet means for providing a magnetic field passing through said magnetic path provided by said yoke means, said permanent magnet means having
        a magnetic direction aligned toward a surface of said coil,
        a length in the magnetic direction, and
        a height in a direction perpendicular to both the magnetic direction and a length direction of said guide rail means, the height of said permanent magnet means being less than the length of said permanent magnet means in the length direction of said guide rail means.

4. The data storage-playback apparatus according to claim 3, wherein said support means is mounted to a side of said head means remote from said permanent magnet means.

5. The data storage-playback apparatus according to claim 3, wherein said support means comprises a rotating member mounted to roll along a length of a side face of said guide rail means.

6. The data storage-playback apparatus according to claim 3, wherein the height of said permanent magnet means is uniform in the length direction of said guide rail means.

7. An optical disk apparatus comprising:
    optical head means for at least one of storing data on an optical disk and reading data from the optical disk;
    guide rail means for guiding said optical head means in a predetermined direction along the optical disk, said guide rail means being composed of a magnetic substance;
    a coil through which said guide rail means passes, said coil being fixed to said optical head means;
    a yoke having a length portion and leg portions extending from the length portion, the leg portions being magnetically coupled with said guide rail means; and
    a permanent magnet fixed to said yoke, the permanent magnet having
        a magnetic direction aligned toward a surface of said coil,
        a length in the magnetic direction, and
        a height in a direction perpendicular to both the magnetic direction and a length direction of said guide rail means, the height of said permanent magnet being less than the length of said permanent magnet in the length direction of said guide rail means.

8. The optical disk apparatus according to claim 7, wherein the height of said permanent magnet is uniform in the length direction of said guide rail means.

9. An optical disk apparatus comprising:
    optical head means for at least one of storing data on an optical disk and reading data from the optical disk;

guide rail means for guiding said optical head means in a predetermined direction along the optical disk, said guide rail means being composed of a magnetic substance;

support means for supporting said optical head means for movement along said guide rail means, said support means being composed of a magnetic substance and being mounted to said optical head means;

a coil through which, said guide rail means passes, said coil being fixed to said optical head means;

a yoke having a length portion and leg portions extending from the length portion, the leg portions being magnetically coupled with said guide rail means; and a permanent magnet fixed to said yoke, the permanent magnet having
- a magnetic direction aligned toward a surface of said coil,
- a length in the magnetic direction, and
- a height in a direction perpendicular to both the magnetic direction and a length direction of said guide rails means, the height of said permanent magnet being less than the length of said permanent magnet in the length direction of said guide rail means.

10. The optical disk apparatus according to claim 9, wherein said support means is mounted to a side of said head means remote from said permanent magnet.

11. The optical disk apparatus according to claim 9, wherein said support means comprises a rotating member mounted to roll along a length of a side face of said guide rail means.

12. The optical disk apparatus according to claim 9, wherein the height of said permanent magnet is uniform in the length direction of said guide rail means.

13. A data storage-playback apparatus comprising:

a head unit for at least one of storing data on a data storage medium and reading data from the data storage medium;

a guide rail composed of magnetic material, the head unit being movable along the guide rail;

a coil through which said guide rail passes, said coil being fixed to said head unit;

a yoke composed of magnetic material, the yoke having a length portion and leg portions extending from the length portion, the leg portions being magnetically coupled with said guide rail; and a permanent magnet fixed to said yoke, said permanent magnet having
- a magnetic direction aligned toward a surface of said coil,
- a length in the magnetic direction, and
- a height in a direction perpendicular to both the magnetic direction and a length direction of said guide rail, the height of said permanent magnet being less than the length of said permanent magnet in the length direction of said guide rail.

14. The data storage-playback apparatus according to claim 13, wherein the height of said permanent magnet is uniform in the length direction of said guide rail.

15. A data storage-playback apparatus comprising:

a head unit for at least one of storing data on a data storage medium and reading data from the data storage medium;

a guide rail composed of magnetic material, the head unit being movable along the guide rail;

a coil through which said guide rail passes, said coil being fixed to said head unit;

a support composed of magnetic material, the support being mounted to said head unit and being movable along said guide rail;

a yoke composed of magnetic material, the yoke having a length portion and leg portions extending from the length portion, the leg portions being magnetically coupled with said guide rail; and a permanent magnet fixed to said yoke, the permanent magnet having
- a magnetic direction aligned toward a surface of said coil,
- a length in the magnetic direction, and
- a height in a direction perpendicular to both the magnetic direction and a length direction of said guide rail, the height of said permanent magnet being less than the length of said permanent magnet in the length direction of said guide rail.

16. The data storage-playback apparatus according to claim 15, wherein the height of said permanent magnet is uniform in the length direction of said guide rail.

* * * * *